(12) United States Patent
Bratt et al.

(10) Patent No.: US 8,321,605 B2
(45) Date of Patent: Nov. 27, 2012

(54) PIO INTERJECTION BETWEEN BEATS OF A DMA OPERATION

(75) Inventors: Joseph P. Bratt, San Jose, CA (US); Lakshmi Rao, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/966,946

(22) Filed: Dec. 13, 2010

(65) Prior Publication Data

US 2012/0151104 A1 Jun. 14, 2012

(51) Int. Cl.
*G06F 13/28* (2006.01)
*G06F 13/00* (2006.01)

(52) U.S. Cl. ............... 710/26; 710/20; 710/22; 710/23; 710/35

(58) Field of Classification Search .......... 710/1, 22–28, 710/33–35
See application file for complete search history.

(56) References Cited

U.S. PATENT DOCUMENTS 5,379,381 A * 1/1995 Lamb .............................. 710/6
5,790,887 A 8/1998 Brech
5,794,072 A 8/1998 Nomura et al.
5,826,107 A 10/1998 Cline et al.
7,249,202 B2 7/2007 Simon et al.
7,356,370 B2 4/2008 Koike et al.

OTHER PUBLICATIONS

Information technology—AT Attachment Interface with Extensions (ATA-2); Jan. 17, 1995; Revision 3; pp. 1-130.*

* cited by examiner

*Primary Examiner* — Chun-Kuan Lee
*Assistant Examiner* — Ronald Modo
(74) *Attorney, Agent, or Firm* — Meyertons, Hood, Kivlin, Kowert & Goetzel, P.C.; Dean M. Munyon; Eric K. Wingrove

(57) ABSTRACT

Techniques are disclosed relating to detecting and interjecting a programmed input/output (PIO) operation into a direct memory access (DMA) operation. In one embodiment, an integrated circuit may include a DMA controller that may contain a control circuit, a DMA unit, and a PIO unit. The control circuit may be configured to detect a pending PIO operation during a DMA operation and interject the PIO operation onto a shared path during the same clock cycle as or the first clock cycle following the detection of the pending PIO operation. The DMA operation may consist of multiple single-clock-cycle beats. In one embodiment, a PIO operation may be interjected onto the shared path between beats of a DMA operation, on consecutive clock cycles. At the next clock cycle following the PIO operation, the control circuit may resume the next beat of the DMA operation.

20 Claims, 5 Drawing Sheets

PIO INTERJECTION BETWEEN BEATS OF A DMA OPERATION

BACKGROUND

1. Technical Field

This disclosure relates generally to processors, and, more specifically, to direct memory access and programmed input/output operations in processors.

2. Description of the Related Art

In various computer architectures, a programmed input/output (PIO) operation may be used by a processor to access a target device, such as keyboards, mice, network cards, flash controllers, etc. The access may include transmitting or receiving data to or from the target device, or setting up direct memory access (DMA) operations on the target device, which allow direct access between memory and a target device independent of the processor.

In certain environments, PIO and DMA operations share a common path to target devices. As a result, several sources of latency may exist in performing PIO operations and corresponding DMA operations. First, when performing a multi-beat, multi-clock cycle DMA burst, a subsequent PIO operation (e.g., to set up a future DMA operation) may need to wait for all beats of the DMA burst to complete before performing the PIO operation. Thus, the subsequent PIO operation is delayed, as is any future corresponding DMA operation. Second, setting up a future DMA operation may require multiple clock cycles to complete a PIO operation, or may require multiple PIO operations. Thus, in some scenarios, each cycle of a PIO operation, or each PIO operation, must potentially wait for other DMA bursts to complete further compounding the delay for the full PIO operation to complete. Over the course of several PIO setup/DMA operation sequences, delays may aggregate and significantly impact the system. The delay can be especially problematic when large amounts of data (e.g., videos or images) need to be transferred using DMA.

SUMMARY

This disclosure describes techniques and structures that facilitate reducing latency in data transfer. In one embodiment, a control circuit may be configured to detect a pending PIO operation during a DMA operation. The control circuit may be configured to switch from driving an address or data for the DMA operation to driving an address or data for a PIO operation onto a shared path in response to detecting the PIO operation during the DMA operation. In one embodiment, the control circuit may be configured to switch to driving the address or data for the PIO operation onto the shared path during the same or immediately subsequent clock cycle after detecting the pending PIO operation. The control circuit may then be configured to switch from driving the address or data for the PIO operation to driving a subsequent address or data for the DMA operation during the clock cycle following the PIO operation. In other words, a DMA operation may include multiple single-clock-cycle beats, where a PIO operation may be interjected between consecutive beats of a DMA operation. In this manner, either a DMA operation, or PIO operation, may be performed at each clock cycle without adding significant latency. Further, in certain embodiments, the techniques and structures disclosed herein may reduce latency by allowing PIO operations (e.g., those that set up future DMA operations) to occur before a DMA operation is completed.

In one particular (non-limiting) embodiment, the PIO and DMA operations may be configured to be transmitted to a target device via a peripheral controller. In various embodiments, a peripheral controller may include multiple buffers, such as ping-pong buffers. In certain embodiments, multiple buffers may reduce latency in PIO/DMA operations by allowing a DMA operation directed to a target device to occur at the same time a subsequent DMA operation is set up via a PIO operation.

DETAILED DESCRIPTION

Figure 1:
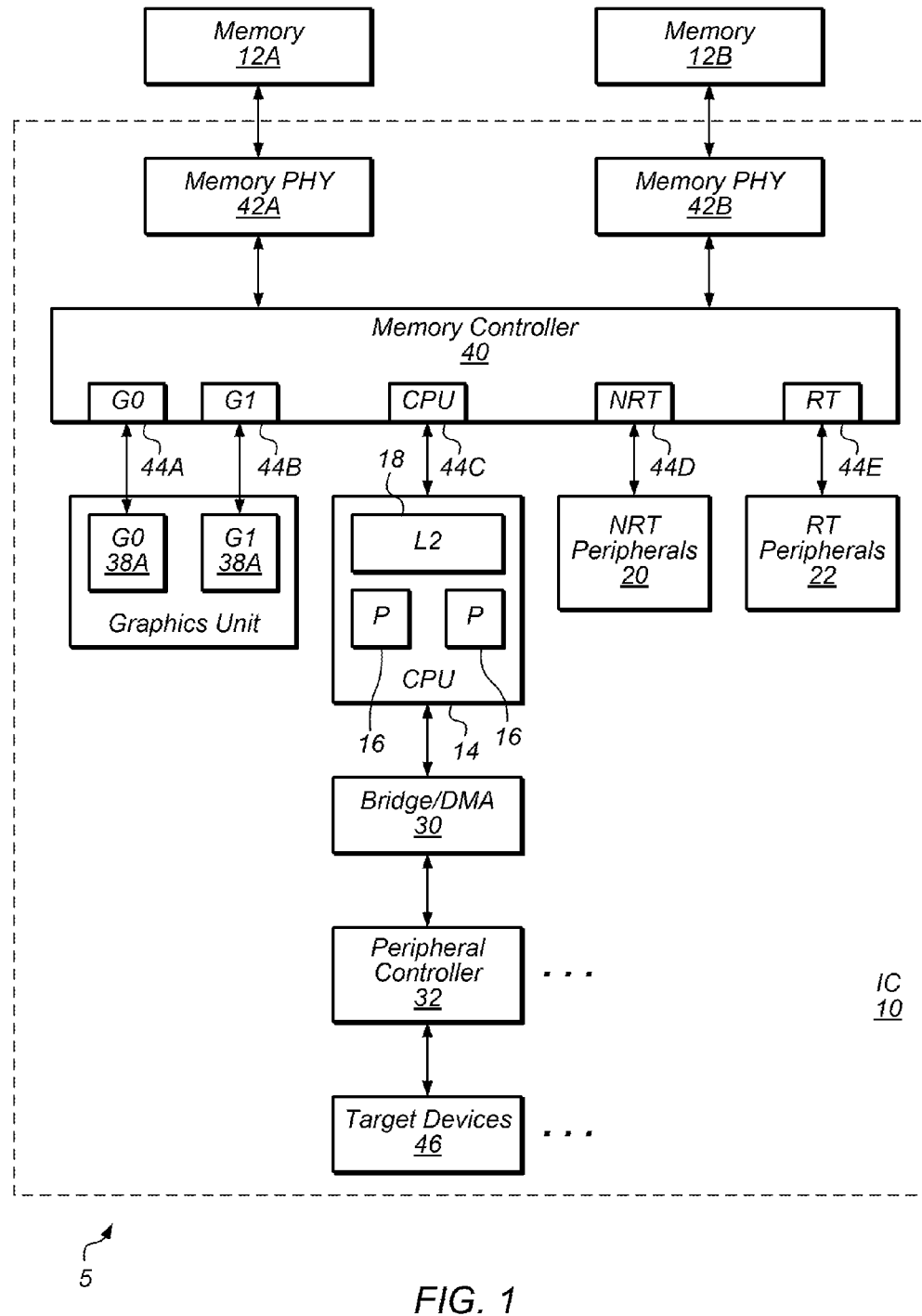
FIG. 1 is a block diagram illustrating one embodiment of an integrated circuit.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, reference to a "first" DMA operation does not necessarily imply that this operation is an initial DMA operation relative to some time frame; instead the term "first" is used to differentiate this operation from another DMA operation (e.g., a "second" DMA operation).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The present disclosure includes embodiments in which a PIO operation is interjected between beats of a DMA operation, allowing the PIO operation to take place without waiting for the completion of a full DMA operation or burst. The disclosure first describes an exemplary system (an SoC), followed by a description of one embodiment of a bridge/DMA controller, including one that can be implemented in the device of FIG. 1.

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more target devices 46 and/or one or more peripheral controllers 32. The number of target devices 46 and peripheral controllers 32 may vary in different embodiments. The system 5 illustrated in FIG. 1 further includes a graphics unit 36 including one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 configured to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as target devices 46 and/or peripherals coupled to a peripheral interface controlled by the peripheral controller 32 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may include circuitry to bridge the target device(s) 46 and the peripheral controller(s) 32 to the memory space. In the illustrated embodiment, the bridge/DMA controller 30 may bridge the memory operations from the peripherals/peripheral controllers through the CPU block 14 to the memory controller 40 or directly to the memory controller 40 (not shown) or NRT peripherals 20 (not shown). The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operations on behalf of the peripherals/target devices 46 and the peripheral controllers 32 to transfer blocks of data to and from memory. More particularly, the DMA controller may be configured to perform transfers to and from the memory 12A-12B through the memory controller 40 on behalf of the target devices 46 and the peripheral controllers 32. The DMA controller may be programmable by the processors 16 to perform the DMA operations. For example, the DMA controller may be programmable via descriptors and registers in the DMA controller (not shown in FIG. 1). The descriptors may be data structures stored in the memory 12A-12B that describe DMA transfers (e.g. source and destination addresses, size, etc.).

Peripherals/target devices 46 may include any desired input/output devices or other hardware devices that are included on the integrated circuit 10. For example, target devices 46 may include networking peripherals such as one or more networking media access controllers (MAC) such as an Ethernet MAC or a Wifi (IEEE 802.11b,g,n) controller. An audio unit including various audio processing devices may be included in target devices 46. One or more digital signal processors may be included in the target devices 46. Target devices 46 may include any other desired function such as timers, an on-chip secrets memory, an encryption engine, etc., or any combination thereof.

Peripheral controller 32 may include controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc. Peripheral controller 32 may include multiple buffers, such as ping-pong buffers. Multiple buffers may allow simultaneous reads and writes to peripheral controller 32. For example, a peripheral/target device 46 may fill one buffer at the same time a PIO operation sets up a DMA operation in another buffer. Data may be alternately read from these buffers (thus "ping-ponging" back and forth between them).

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
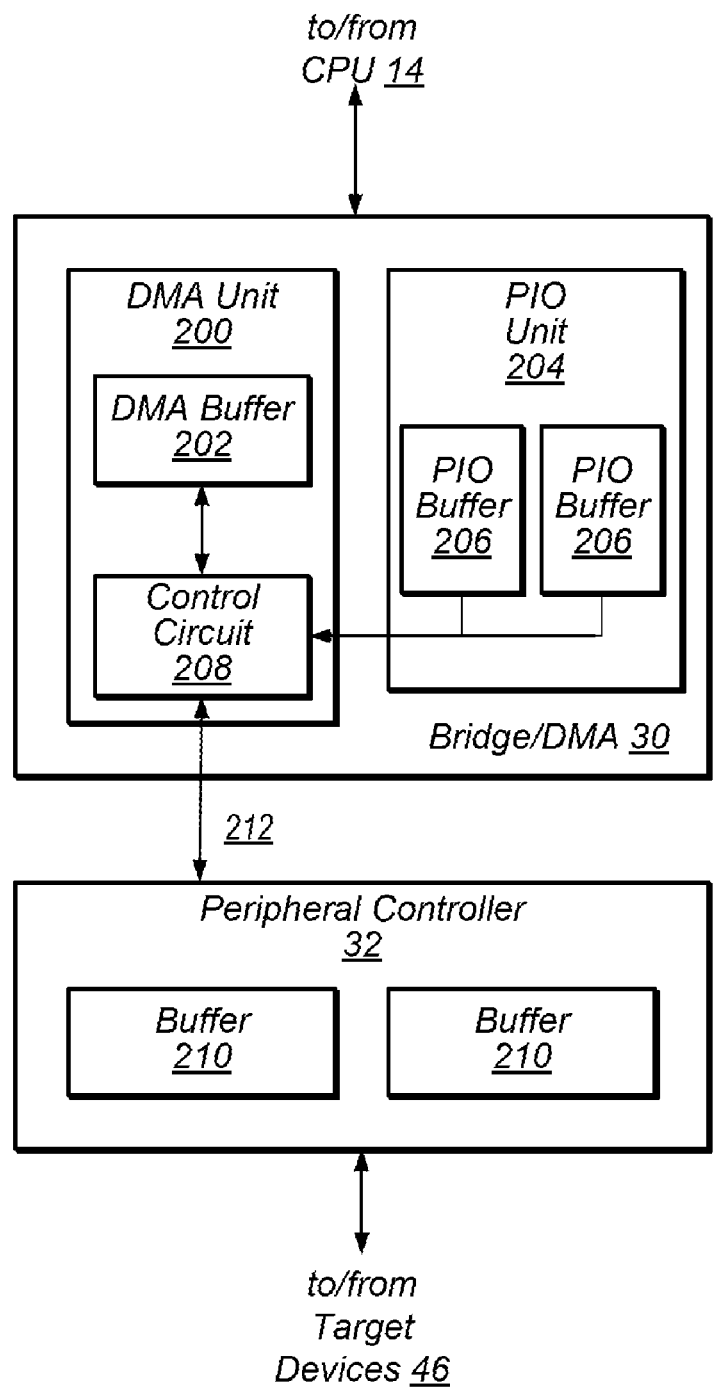
FIG. 2 is a block diagram of one embodiment of a direct memory access (DMA) controller/bridge.
Figure 4:
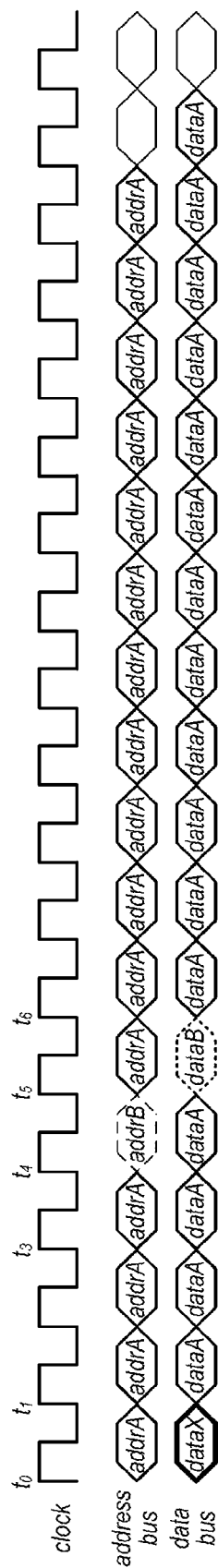
FIG. 4 is a timing diagram illustrating one embodiment of a PIO detect and interject process.

Turning now to FIG. 2, a block diagram of a portion of one embodiment of a bridge/DMA controller 30 is shown. In the embodiment shown, bridge/DMA controller 30 may include DMA unit 200 and PIO unit 204. Bridge/DMA controller 30 may be coupled to CPU 14 and to peripheral controller 32 via shared interface 212. Peripheral controller 32 may include multiple buffers 210 that may allow a target device 46 to transmit data to one buffer as part of a DMA operation and, at the same time, a second buffer may receive a PIO operation to set up the next DMA transfer. In one embodiment, buffers 210 may be ping-pong buffers. Not shown in the figures, bridge/DMA controller 30 may receive a reference clock from another component within IC 10. The reference clock includes repeating portions ("clock cycles") that may include a rising edge and falling edge. As seen in FIG. 4, an example reference clock (square wave) and clock cycle are shown. Bridge/DMA controller 30 may transmit clock cycle long portions of a DMA or PIO operation to peripheral controller 32 along a bus. Both peripheral controller 32 and the bus may receive the same or different reference clock that bridge/DMA controller 30 received. Data and addresses, such as those for DMA or PIO operations, may be transmitted at each rising edge of the clock cycle, each falling edge of the clock cycle, or both.

As used herein, a DMA operation represents an aggregate of related DMA bursts. Accordingly, a DMA operation may include a single DMA burst or multiple DMA bursts. Each DMA burst may include a plurality of single-clock-cycle beats. Each beat may include both an address and associated data for a single clock cycle. Alternatively, each beat may include only an address or data for a single clock cycle. In one embodiment, DMA operations may include 16 or 32 beats of data.

Referring back to FIG. 2, in one embodiment, PIO unit 204 may include multiple PIO buffers 206 that may be configured to store addresses and data associated with a PIO operation. PIO buffers 206 may transmit PIO operations to peripheral controller 32 and target devices 46 via DMA unit 200. PIO unit 204 and PIO buffers 206 may be programmable by processors 16 to perform PIO operations. PIO operations may include an address portion and data portion. In one embodiment, PIO operations may include transmitting data to be written to various target devices 46, receiving data from various target devices 46, and setting up various controllers or target devices 46 for DMA operations. In one embodiment, PIO operations may be processed by control circuit 208 and transmitted to peripheral controller 32 and target device 46 via shared interface 212, which may be the same interface used in DMA operations. In one embodiment, shared interface 212 may include two shared data buses, one to transmit addresses and another to transmit data. In another embodiment, interface 212 may include both an address and data portion.

DMA unit 200 may include DMA buffer 202 and control circuit 208. DMA buffer may be configured to store an address and data associated with a DMA operation. DMA buffer 202 may also be configured to receive data from a target device 46 and transmit the data to CPU 14, memory controller 40, or NRT peripherals 20.

In one embodiment, control circuit 208 may be configured to detect a pending PIO operation and select between a DMA operation, from DMA buffer 202, and a PIO operation, from PIO buffers 206, to determine which address and data to drive onto the shared path. In one embodiment, DMA operations and PIO operations may be transmitted to control circuit 208 at the start of a clock cycle allowing the capability for detection and selection of the pending PIO operation within the same cycle. Upon detecting the pending PIO operation, control circuit 208 may be configured to switch from driving an address and data for a DMA operation to driving an address and data for a PIO operation onto shared interface 212. The PIO operation may be driven onto shared interface 212 during the same clock cycle or the clock cycle immediately after control circuit 208 detects that the PIO operation is pending. For example, if a DMA operation is in progress when control circuit 208 detects a pending PIO operation, control circuit 208 may switch to driving the PIO operation during the clock cycle in which the PIO operation was detected. In one embodiment, control circuit 208 may switch to driving the PIO operation at the start of the clock cycle following the clock cycle in which the PIO operation was detected. In either case, this may coincide with the completion of a single-clock-cycle beat of the DMA operation. In one embodiment, upon completion of a PIO operation that was interjected between beats of the DMA operation, control circuit 208 may switch from driving the address and data for the PIO operation to driving the subsequent address and data for the DMA operation that corresponds to the next beat in the DMA operation. The switch back may be as soon as the next clock cycle. In other words, in one embodiment, in consecutive clock cycles, a beat of a DMA operation, a PIO operation, and the next beat of the same DMA operation may be driven on the shared bus.

A bridge/DMA 30 that includes a control circuit 208 that may detect a pending PIO operation and interject the PIO operation between beats of a DMA operation without waiting for the DMA operation to complete may improve performance of IC 10. For example, bridge/DMA 30 may minimize PIO write latency to peripherals and, in turn, minimize latency of subsequent reads and writes from and to peripherals. Utilizing such a detect and interject process over the course of several PIO/DMA sequences may yield many-fold performance improvements in some instances.

Figure 3:
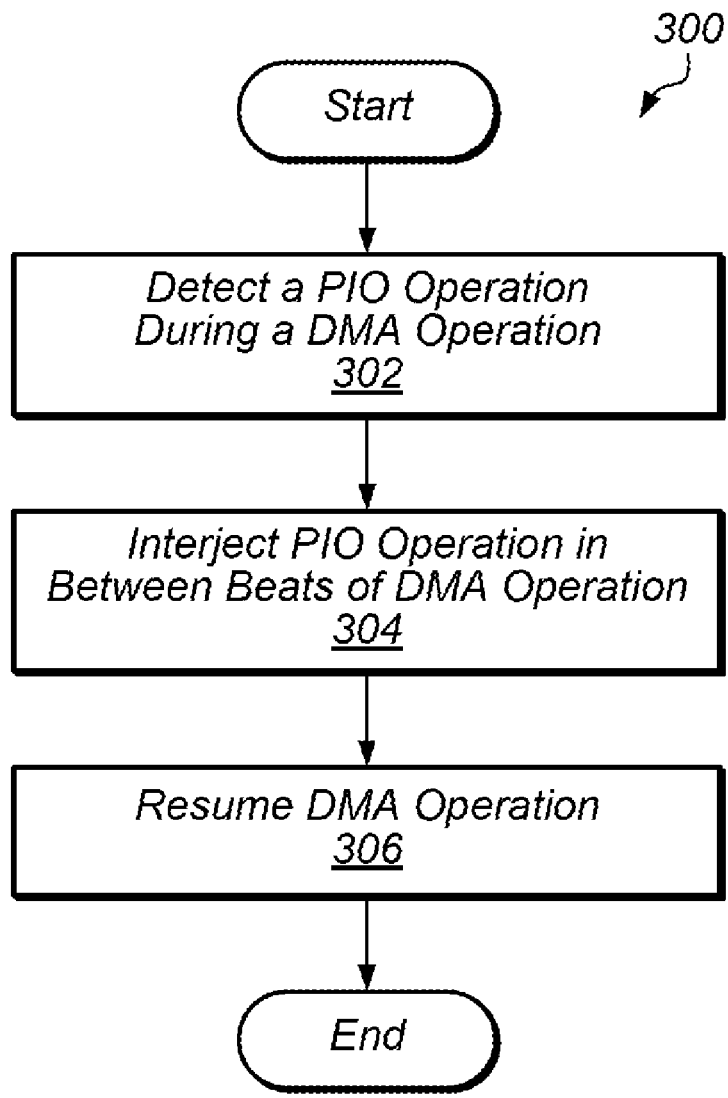
FIG. 3 is a flowchart illustrating operation of one embodiment of a programmed input/output (PIO) detect and interject process.

Turning now to FIG. 3, one embodiment of a PIO detect and interject process is shown. In one embodiment, control circuit 208 may perform method 300. The steps may alternatively be performed by other components of bridge/DMA controller 30. In some embodiments, method 300 may include additional (or fewer) steps than shown.

In step 302, control circuit 208 may detect a pending PIO operation during a DMA operation. In one embodiment, control circuit 208 may be a subcomponent of DMA unit 200 and receive PIO operations from PIO buffers 206 and DMA operations from DMA buffer 202. In some embodiments, control circuit 208 may receive an indication that a PIO operation is pending and may then detect the pending PIO operation. In other embodiments, control circuit 208 may simply receive a PIO operation and trigger an internal indication that a PIO operation is pending.

In step 304, control circuit 208, upon detection of a pending PIO operation, may cause the pending PIO operation to be transmitted to peripheral controller 32. In one embodiment, control circuit 208 may detect the pending PIO operation during an active DMA operation. Control circuit 208 may cause the pending PIO operation to be interjected in between single-clock-cycle beats of the DMA operation. In one embodiment, control circuit 208 may switch from driving an address and data for the DMA operation onto shared interface 212 to driving an address and data for the PIO operation. The switch may occur during the same clock cycle in which the PIO was detected or on the immediately subsequent clock cycle in response to the detection. In either case, the current single-clock-cycle beat of the DMA operation may complete before the PIO operation is interjected. In various embodiments, DMA and PIO operations may share multiple paths, such as an address bus and a data bus. Data on the data bus may correspond to an address on the address bus of the previous clock cycle. For example, if the address 07h is driven on the address bus in clock cycle 1, then data corresponding to address 07h may be driven on the data bus in clock cycle 2. The shared paths may couple DMA unit 200 and PIO unit 204 to peripheral controller 32 and, ultimately, to target devices 46.

In step 306, control circuit 208 may resume the DMA operation. In one embodiment, the next beat of the DMA operation following the interjection may resume on shared interface 212 the immediate clock cycle following the PIO operation. In some embodiments, a PIO operation may include multiple clock cycles worth of addresses and data. The PIO operation may continue the multiple clock cycles until completion before the DMA is resumed. In some embodiments, a multi-clock-cycle PIO operation may not occur in consecutive clock cycles. In such an embodiment, each clock cycle of the PIO operation may be interjected in between beats of an ongoing DMA operation upon detection of each clock cycle of the PIO operation. Upon completion of each clock cycle of the PIO operation, the DMA operation may resume.

Consider the following examples for various embodiments of the PIO detection and interjection process. In one embodiment, a DMA operation may include a single DMA burst of 16 beats (i.e., a DMA operation may include a single DMA burst that includes 16 clock cycles worth of data) starting at a first clock cycle. If control circuit 208 detects a pending PIO operation after the third beat of the 16-beat DMA operation (and the start of the fourth clock cycle), the PIO operation may be interjected in the fourth clock cycle. When the PIO operation completes at the end of the fourth clock cycle, the DMA operation may resume, in this example, with the fourth beat of the 16-beat DMA operation at the rising edge of the fifth clock cycle. If a second PIO operation, or a second cycle of a single PIO operation, occurs during this example 16-beat DMA operation, the DMA operation may be preempted in a similar manner. Likewise, if an operation from a different PIO buffer is pending during a PIO operation or at the same time another PIO operation from the original PIO buffer is pending, the two PIO operations may occur on consecutive clock cycles. After the consecutive clock cycle PIO operations, the DMA operation may resume as discussed herein. In some embodiments, a second PIO operation may occur in a consecutive cycle only if no DMA operation is pending. In such an embodiment, a first PIO operation may take place on a first clock cycle, a beat of the DMA operation on the second cycle, and the second PIO operation on the third cycle. At that point, the DMA operation may resume. In some embodiments, a second PIO operation may not take place until the completion of all the beats of the current DMA burst.

For environments where DMA operations include many beats, or in graphics intense applications, control circuitry that interjects a PIO operation in between beats of a DMA operation, or between consecutive clock cycle DMA operations, may minimize latency thereby improving performance. In addition to reducing the latency of a given DMA/PIO sequence, compound time savings may result when multiple DMA/PIO sequences occur.

Turning now to FIG. 4, a timing diagram of one embodiment of the PIO detect and interject process is shown. In the illustrated timing diagram, a clock square wave is shown representing clock cycles of the system. In addition, an address bus and data bus are shown. The address and data buses may be two shared buses, shared interface 212, which may couple DMA unit 200 and PIO unit 204 to peripheral controller 32.

In the illustrated timing diagram, each clock cycle may include an address driven on the address bus and data driven on the data bus. For example, "dataA" and "addrA" may represent the data and address for a beat of a DMA operation, respectively. In this example, the DMA operation includes 16 beats. In other embodiments, DMA operations may include a number of beats other than 16, such as 4, 8, 32, 64, etc. As shown, the address for the first beat of a DMA operation may be driven on the address bus at time $t_0$ and at time $t_1$, the data for the first beat of the DMA operation may be driven on the data bus. After the third data beat of the DMA operation, control circuit 208 may detect a pending PIO operation. At time $t_4$, which may be the clock cycle in which the PIO operation was detected, control circuit 208 may drive the address for the PIO operation ("addrB"). In one embodiment, the addresses and data may be driven at a small delay after the rising edge of the clock cycle. Subsequently, at time $t_5$, control circuit 208 may drive the data for the PIO operation ("dataB") and may resume driving the address for the next beat of the DMA operation (fifth beat in this example). At time $t_6$, control circuit 208 may resume driving the DMA operation on the data bus.

In one embodiment, not shown in FIG. 4, control circuit 208 may detect another PIO operation, which may be from the same PIO buffer or from a different PIO buffer, and interject the additional PIO operation in between beats of the same or different DMA operation. In addition, control circuit 208 may detect a PIO operation and drive its address and data on the shared buses in between DMA operations, for example, if no DMA operation was in progress or if the DMA operation was driving its last beat when the PIO was detected.

In certain environments, interjecting PIO operations between beats of a DMA operation, or between DMA operations, may optimize performance between a CPU 14 and various target devices 46. For example, a subsequent DMA operation that may occur after a current DMA operation may be set up during the current DMA operation by interjecting the PIO that may set up the subsequent DMA operation. Then, upon completion of the current DMA operation, the subsequent DMA operation may immediately begin. For DMA operations that require multiple PIO set up operations before commencing, the interjection(s) may maximize performance by minimizing latency of PIO operations. Over the course of many PIO/DMA sequences, the performance gain may be significant.

Exemplary Computer System

Figure 5:
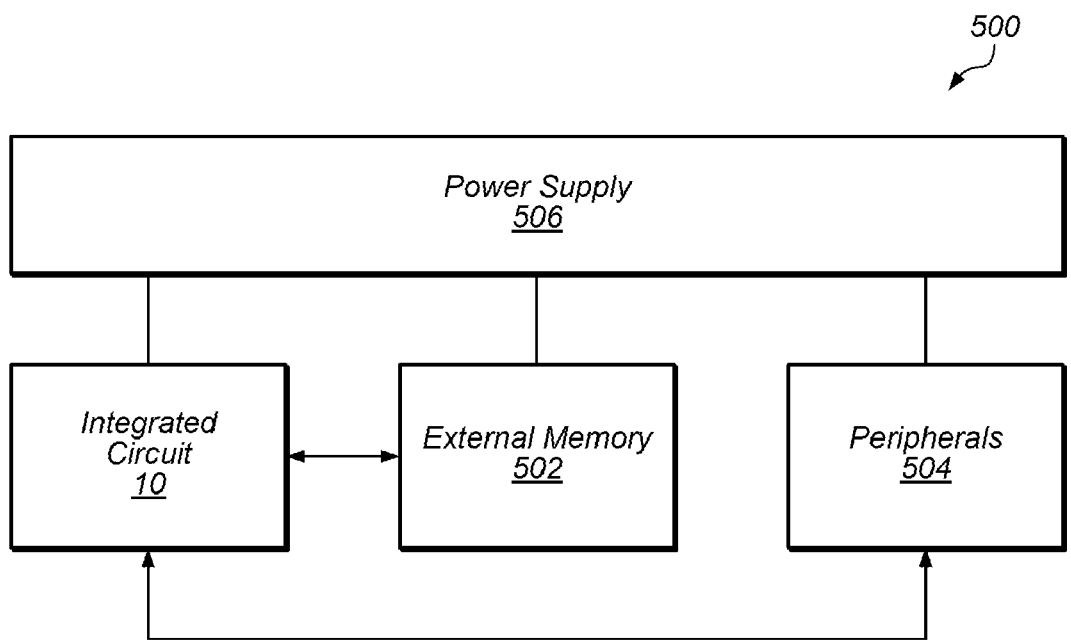
FIG. 5 is a block diagram of one embodiment of a system.

Turning next to FIG. 5 a block diagram of one embodiment of a system 500 is shown. In the illustrated embodiment, the system 500 includes at least one instance of an integrated circuit 10 coupled to an external memory 502. The external memory 502 may form the main memory subsystem discussed above with regard to FIG. 1 (e.g. the external memory 502 may include the memory 12A-12B). The integrated circuit 10 is coupled to one or more peripherals 504 and the external memory 502. A power supply 506 is also provided which supplies the supply voltages to the integrated circuit 10 as well as one or more supply voltages to the memory 502 and/or the peripherals 504. In some embodiments, more than one instance of the integrated circuit 10 may be included (and more than one external memory 502 may be included as well).

The memory 502 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 504 may include any desired circuitry, depending on the type of system 500. For example, in one embodiment, the system 500 may be a mobile device (e.g. personal digital assistant (PDA), smart phone, etc.) and the peripherals 504 may include devices for various types of wireless communication, such as wifi, Bluetooth, cellular, global positioning system, etc. The peripherals 504 may also include additional storage, including RAM storage, solid state storage, or disk storage. The peripherals 504 may include user interface devices such as a display screen, including touch display screens or multitouch display screens, keyboard or other input devices, microphones, speakers, etc. In other embodiments, the system 500 may be any type of computing system (e.g. desktop personal computer, laptop, workstation, net top etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a control circuit configured to switch from driving an address for a direct memory access (DMA) operation onto a bus during a first clock cycle to driving an address for a programmed input/output (PIO) operation onto the bus during a second clock cycle in response to detecting the PIO operation during the DMA operation;
   wherein the second clock cycle follows the first clock cycle without any intervening clock cycles.

2. The apparatus of claim 1, further comprising:
   a DMA buffer configured to store an address associated with the DMA operation; and
   a PIO buffer configured to store an address associated with the PIO operation;
   wherein the control circuit is configured to select between the DMA buffer and the PIO buffer in determining which address to drive onto the bus.

3. The apparatus of claim 2, wherein the control circuit is configured to switch from driving the address for the PIO operation onto the bus during the second clock cycle to driving a subsequent address for the DMA operation onto the bus during a third clock cycle.

4. The apparatus of claim 3, wherein the address for the DMA operation and the subsequent address for the DMA operation correspond to successive beat transfers.

5. The apparatus of claim 1, wherein the bus is coupled to a peripheral controller, and wherein the DMA operation and the PIO operation are directed to a target device coupled to the peripheral controller.

6. An apparatus, comprising:
a direct memory access (DMA) buffer configured to store an address associated with a first beat of a DMA operation;
a first programmed input/output (PIO) buffer configured to store an address associated with a first PIO operation;
a control unit coupled to the DMA buffer, the first PIO buffer and an address bus, wherein the control unit is configured to control addresses driven onto the address bus, and wherein, in response to determining that the first PIO operation is pending during the DMA operation, the control unit is configured to interject the address associated with the first PIO operation onto the address bus during a next clock cycle after a clock cycle in which the address associated with the beat of the DMA operation is driven onto the address bus;
wherein the next clock cycle follows the clock cycle in which the address associated with the beat of the DMA operation is driven onto the address bus without any intervening clock cycles.

7. The apparatus of claim 6, further comprising:
a second PIO buffer configured to store an address associated with a second PIO operation, wherein the control unit is coupled to the second PIO buffer and wherein, in response to determining that the second PIO operation is pending during the DMA operation, the control unit is configured to interject the addresses associated with a second beat of the DMA operation and the second PIO operation onto the address bus during an immediately subsequent two clock cycles after the address associated with the first PIO is interjected onto the address bus.

8. The apparatus of claim 7, wherein the control circuit is configured to drive an address associated with a third beat of a DMA operation in a first clock cycle immediately following the completion of the second PIO operation.

9. The apparatus of claim 6, wherein the apparatus is configured to perform the first PIO operation over a plurality of clock cycles, and wherein the control unit is configured to interject the address associated with a second PIO operation onto the address bus during a clock cycle immediately after a clock cycle in which the first PIO operation is complete.

10. The apparatus of claim 6, wherein the address bus is coupled to a peripheral controller and wherein the DMA operation is directed to a first target device coupled to the peripheral controller and the PIO operation is directed to a second target device coupled to the peripheral controller.

11. An apparatus, comprising:
a direct memory access (DMA) unit configured to perform DMA operations that include single-clock-cycle beat transfers between the apparatus and a controller via a bus;
a programmed input/output (PIO) unit configured to perform PIO operations that include transfers between the apparatus and controller via the bus;
a control circuit configured to detect that a first PIO operation is received during a DMA operation and cause an address for the first PIO operation to be driven on the bus during a second clock cycle that is after a first clock cycle for a first beat transfer of successive beat transfers of the DMA operation, wherein the second clock cycle follows the first clock cycle without any intervening clock cycles.

12. The apparatus of claim 11, wherein the control circuit is configured to cause an address for a second beat transfer of the DMA operation to be driven on the bus during a next clock cycle after the first PIO operation is driven on the bus, wherein the second beat transfer is one of the successive beat transfers.

13. The apparatus of claim 11, wherein the control circuit is configured to detect a second PIO operation during the second clock cycle, and cause an address for a second beat transfer of the DMA operation and an address for the second PIO operation to be driven on the bus during two clock cycles immediately following the completion of the first PIO operation.

14. The apparatus of claim 13, wherein the control circuit is configured to cause an address for a third beat transfer of the DMA operation to be driven on the bus during a next clock cycle after the second PIO operation is driven on the bus, wherein the third beat transfer is one of the successive beat transfers.

15. The apparatus of claim 11, wherein the DMA operations and PIO operations are targeted to one or more devices coupled to the controller.

16. A method, comprising:
a control circuit detecting a pending programmed input/output (PIO) operation while a direct memory access (DMA) operation is in progress, wherein the DMA operation comprises a plurality of single-clock-cycle beats of data; and
the control circuit interjecting the PIO operation onto a data path in a first clock cycle following a current beat of the DMA operation, wherein the PIO operation follows the current beat of the DMA operation without any intervening clock cycles.

17. The method of claim 16, further comprising the control circuit resuming the DMA operation by switching a next beat after the current beat of the DMA operation onto the data path an immediate clock cycle following the PIO operation.

18. The method of claim 16, further comprising:
a peripheral controller receiving a beat of the DMA operation at a first time;
the peripheral controller receiving the PIO operation at a second time, wherein the second time is an immediate clock cycle following the first time; and
the peripheral controller receiving a successive beat of the DMA operation at a third time, wherein the third time is an immediate clock cycle following the second time.

19. The method of claim 18, further comprising:
the peripheral controller transmitting the plurality of single-clock-cycle beats of data of the DMA operation to a device and receiving another PIO operation at a fourth time.

20. The method of claim 16, further comprising a peripheral controller, wherein the peripheral controller comprises multiple buffers to simultaneously receive the PIO operation and a data transfer from a device coupled to the peripheral controller.

* * * * *